Jan. 6, 1953 C. S. BOLOGNINO ET AL 2,624,126
TOY DEVICE FOR TEACHING MULTIPLICATION TABLES
Filed May 3, 1950 2 SHEETS—SHEET 1

INVENTOR
Charles S. Bolognino.
Secondo M. Bolognino.
BY Thos. H. Johnston
ATTORNEY

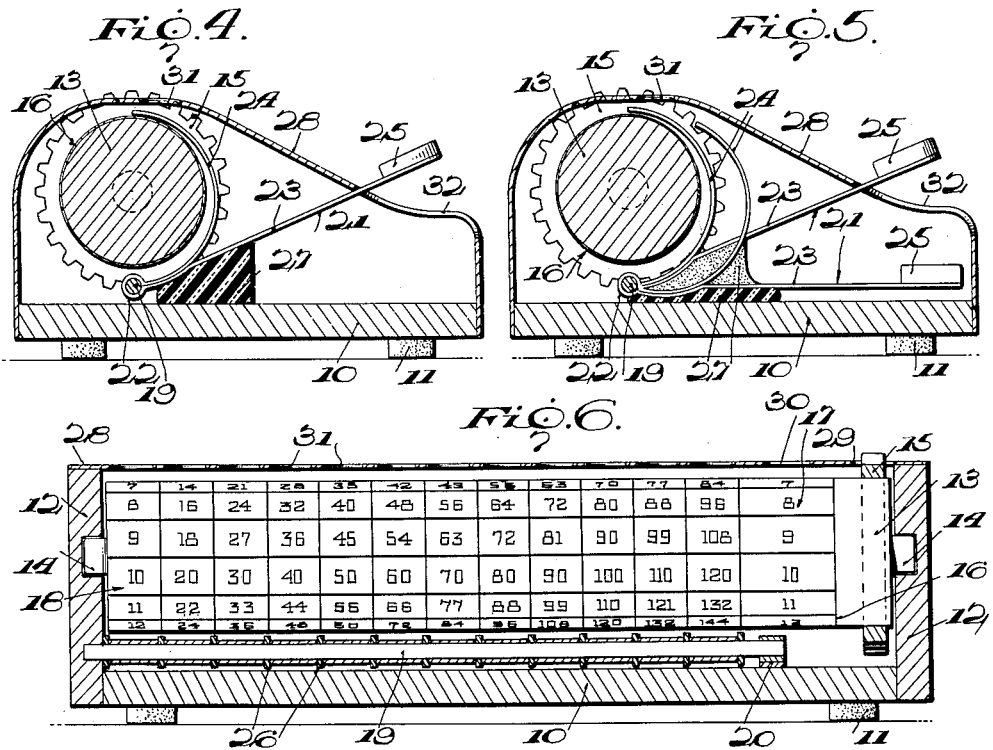

Patented Jan. 6, 1953

2,624,126

UNITED STATES PATENT OFFICE 2,624,126

TOY DEVICE FOR TEACHING MULTIPLICATION TABLES

Charles S. Bolognino and Secondo M. Bolognino, Dearborn, Mich.

Application May 3, 1950, Serial No. 159,822

2 Claims. (Cl. 35—31)

1

This invention relates to an improved toy device for teaching multiplication tables, preferably the tables 1 to 12 inclusive.

The difficulties presented in trying to learn the usual span of multiplication tables is more or less a retrospect of tedious experience common to most everyone. The tables, as presented in books on arithmetic, are usually, to the youthful mind, abstract, uninviting, and quite often produce the reaction of a maze of numbers, with the result that learning the tables becomes an arbitrary feat of memory acquired only after much repetition.

An object of the present invention, therefore, is to provide a device which will afford an interest in learning multiplication tables, and, by introducing a concomitant selective manual operation of a number of keys, will tend to lend intrigue in a repetition of the progression of any given table.

A further object of the invention is to provide a device embodying a cylinder, wherein the cylinder will be provided with a chart having an annular series of multiplicand numbers thereon, from 1 to 12 inclusive, and corresponding aligned longitudinal rows of product numbers, wherein said rows will embody the several products of the tables from 1 to 12 respectively, wherein the cylinder may be manually set to select the multiplicand number and corresponding row of product numbers of any chosen table, wherein shutters will be provided to normally conceal the selected row of product numbers, wherein said shutters will be provided with levers bearing the multiplier numbers 1 to 12 respectively, and wherein said levers may be selectively depressed manually to rock any chosen shutter to open position and expose the product number embodying the product of the selected multiplicand number multiplied by the multiplier number of the key depressed.

And the invention seeks, as a still further object, to provide a device which will be sturdy and not easily liable to breakage, while, however, mechanical refinement will be more or less subordinated to inexpensive manufacture, thus to provide a toy which may be sold at moderate cost.

Other and incidental objects of the invention will appear during the course of the following description thereof, and in the drawings.

2

Figures 1, 2, 3:
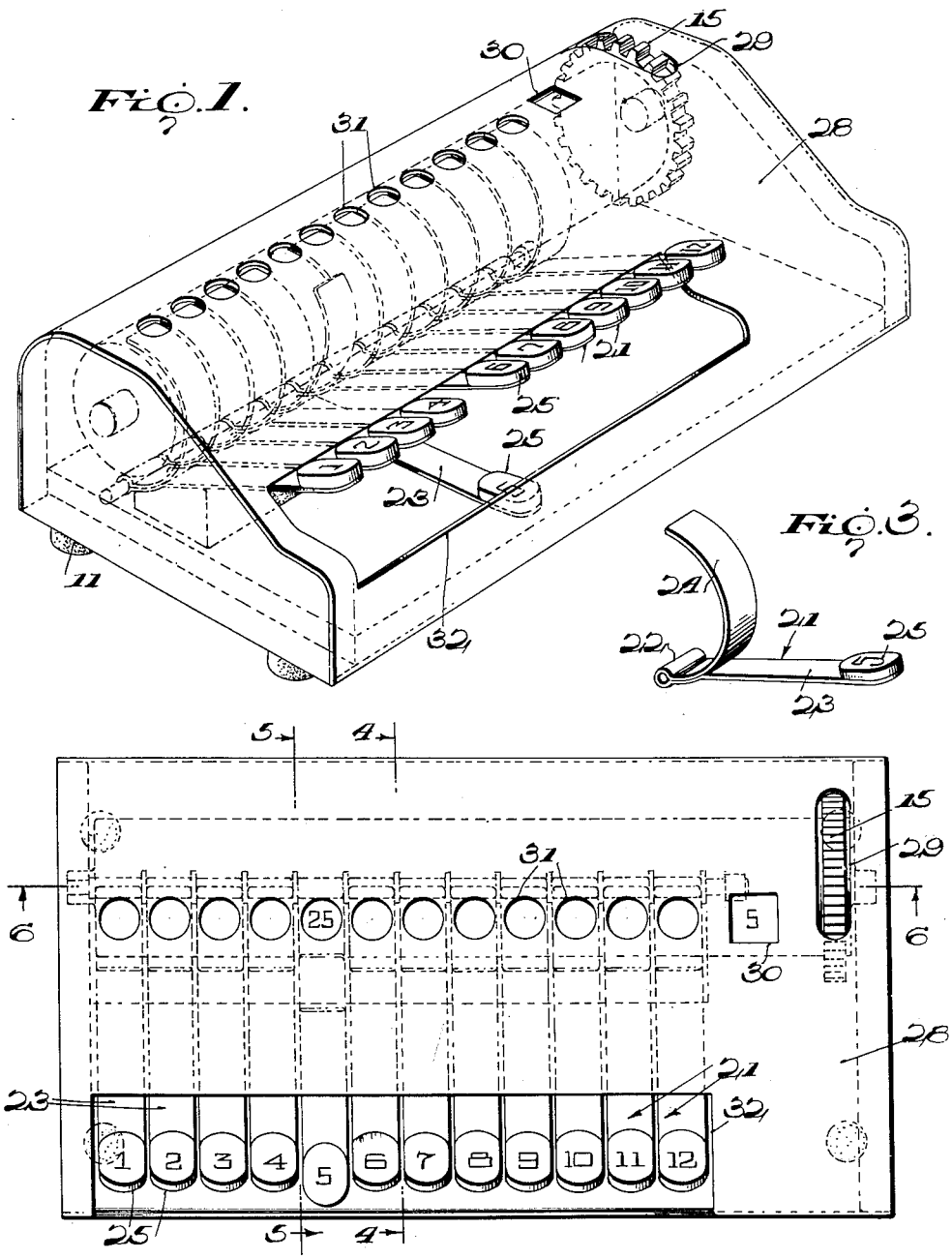
Figure 1 is a perspective view of our improved device, the multiplier 5 key being shown depressed.
Figure 2 is a plan view, the multiplier 5 key being shown depressed.
Figure 3 is a detail perspective view of one of the shutters.

Figure 4 is a transverse vertical section on the line 4—4 of Figure 2.

Figure 5 is a transverse vertical section on the line 5—5 of Figure 2.

Figure 6 is a vertical longitudinal section on the line 6—6 of Figure 2.

Figure 7 is a detail plan view of the chart employed.

In carrying the invention into effect, we employ a rectangular base 10 of wood or other approved material, and fixed to the base at its lower side are yieldable knobs 11 adapted to obviate scuffing of the surface upon which the device is placed.

Fixed to the ends of the base 10 are end walls 12 which, like the base, may also be of wood, and, as best seen in Figures 4 and 5 of the drawings, the upper edges of said end walls are curved so that the end walls are reduced in height toward the forward longitudinal edge of the base.

Mounted upon the end walls 12 is a cylinder 13. This cylinder, like the base and end walls, may be of wood, and formed on the ends thereof are axial trunnions 14 journaled in suitable sockets in said end walls. The cylinder may thus be rotated, and suitably secured to said cylinder near the right-hand end thereof, as viewed in the drawings, is a surrounding hand wheel 15 preferably notched at its outer periphery so that, by turning said wheel with the fingers, the cylinder may be readily rotated and set in a chosen position. The hand wheel may be of plastic.

Tightly surrounding the cylinder 13 is a chart 16, shown in detail in Figure 7 of the drawings. This chart may be of paper or other approved material and may be adhesively secured about the cylinder, tacked thereto, or otherwise fixed to said cylinder.

As best seen in Figure 7, the chart 16 is provided near the right-hand end thereof with an annular series 17 of spaced multiplicand numbers comprising the numbers 1 to 12 inclusive. If so desired, these numbers may be in red.

The chart 16 is further provided in longitudinal alignment with the multiplicand numbers with spaced rows 18 of corresponding product numbers, the several rows respectively embodying the products of the tables 1 to 12 inclusive. For instance, the first of the rows 18 at the top of the chart, as viewed in Figure 7, comprises the product numbers of the 1 table, the second row the product numbers of the 2 table, and so on until the last row is reached which comprises the product numbers of the 12 table. Thus, the product numbers of each row comprise the several products of the corresponding multiplicand number of such row multiplied by the respective numbers 1 to 12 inclusive. The product numbers are preferably in black so as to contrast with the red of the multiplicand numbers.

Arranged beneath the cylinder 13 is a shutter rod 19. As shown in Figure 6 of the drawings, the rod is fixed at one end in a suitable socket in the end wall 12 at the left, and fixed to the base 10 is a suitable bracket 20 mounting the rod at its opposite end. Journaled upon said rod is a series of 12 shutters, each indicated as a whole at 21.

As brought out in detail in Figure 3 of the drawings, each of the shutters 21 is preferably fabricated from a strip of suitable sheet metal bent intermediate its ends to form a sleeve 22. One end portion of the strip is continued from the sleeve to provide a straight lever 23, while the other end portion of the strip is continued from the sleeve to provide an arcuate shutter plate 24 curving upwardly and rearwardly with respect to the sleeve above said lever. Clipped or otherwise fixed to the free end of the lever 23 is a suitable key 25.

It is now to be noted that the sleeves 22 of the several shutters 21 more or less snugly fit the rod 19, mounting the shutters to rock freely upon the rod, and spacing the shutters are suitable washers 26 surrounding the rod between the sleeves. As will be observed, the levers 23 of the shutters are disposed to extend forwardly from beneath the cylinder 13 normally inclined upwardly, while the shutter plates 24 are disposed to curve upwardly and rearwardly about said cylinder. It is further to be noted that the keys 25 of the several shutters 21 carry preferably embossed multiplier numbers thereon embodying, successively, the numbers 1 to 12 inclusive.

Suitably secured to the base 10 to extend longitudinally thereof beneath the inner end portions of the levers 23 of all of the shutters 21 is a yieldable resilient pad 27 of triangular shape in cross section. The upper inclined face of the pad is slanted to seat the levers 23 flat thereagainst, and, in the embodiment of the invention shown, said pad is preferably formed of so-called sponge rubber or the like, being thus of extreme resiliency and yieldable softness. The pad may, accordingly, be readily crushed or compressed by any one of the levers 23 upon being depressed, while, however, the pad will normally press said levers upwardly to the limit of their upward throw and hold the shutter plates 24 in closed position. In the closed position of the shutters, the free end portions of the plates are, as best seen in Figures 4 and 5 of the drawings, disposed to overlie the selected row of product numbers at the time uppermost on the cylinder 13 and conceal the numbers of said row, while, however, when said levers are individually depressed, the shutter plate of each thereof will, as brought out in Figure 5, be rocked forwardly away from the cylinder to open position exposing to view a corresponding product number of the row selected.

Fitting over the end walls 12 as well as over the base 10 mating therewith is a cover 28 cooperating with the base and said end walls to provide a casing housing the parts mounted therein. The cover may be of metal or other approved material and, preferably, is detachably secured to the base in any approved manner.

Formed in the cover 28 to freely accommodate a portion of the hand wheel 15 therethrough is a slot 29, and formed in the adjacent portion of the cover above the cylinder 13 is a preferably square multiplicand sight opening 30 through which the multiplicand numbers of the series 17 are selectively visible. Aligning with the opening 30 is a row of twelve preferably circular product sight openings 31 through which the rows 18 of product numbers may be selectively viewed. The cover is further provided in the lower forward portion thereof with an oblong opening 32 which freely receives the forward end portions of the levers therethrough, and, as brought out in Figure 1 of the drawings, the upper longitudinal wall of said opening serves to limit the levers in their upward swinging movement. The free ends of the shutter plates 24 are thus normally held out of contact with the cylinder 13.

Assuming now that a child is endeavoring to learn the 5 multiplication table, the cylinder 13 is, as shown in Figure 2 of the drawings, set by the hand wheel 29 to expose the multiplicand number 5 at the sight opening 30. The corresponding row of product numbers of table 5 will thus also be selected and disposed under the sight openings 31 but covered and concealed by the free end portions of the shutter plates 24. Thus, when the key 25 bearing the multiplier number 1 is depressed by the child, the corresponding shutter plate 24 will be swung forwardly to open position exposing the product number 5 at the first of the sight openings 31. Similarly, when the key 25 bearing the multiplier number 5 is depressed, as shown in Figure 2 of the drawings, the product number 25 will be exposed to view at the fifth of the sight openings 31.

It is believed that from the foregoing, the operation of the device will be grasped without further explanation. As will be perceived, any one of the tables from 1 to 12 inclusive may be selected at will, while the proper product number of each table will be exposed to view in response to the manual actuation of the particular key depressed.

In Figure 5 of the drawings, we have shown the action of the levers 23 of the shutters 21 on the pad 27 when said levers are depressed to rock the shutters to open position. The lever of the fifth shutter is shown swung down, and, as will be observed, the underlying portion of the pad is compressed. Consequently, upon the manual release of the lever, the compressed portion of the pad will expand and thus return the lever upwardly and hold the shutter in closed position. As will be understood, the pad will function in like manner in conjunction with the levers of all of the shutters, and in this connection it may be noted that, due to the soft resilient character of the pad, the actuation of any one lever will not affect the corresponding portion of the pad sufficiently to cause appreciable lowering of the levers at opposite sides of the lever depressed.

Having thus described our invention, we claim:

1. In a device of the character described, the combination with a cylinder, of a rod mounted beneath said cylinder, a shutter fashioned from a flat, sheet-metal strip formed at a point intermediate of its ends with a sleeve having one end portion of the strip extending rearwardly therefrom to provide a lever and the other end portion of the strip curving upwardly and forwardly from said sleeve to provide an arcuate shutter plate resting at its lower end portion upon the inner end portion of the lever, said sleeve being journaled upon said rod and pivotally mounting the shutter thereon, and yieldable means normally holding said lever to incline upwardly and rearwardly from said rod and maintain said shutter plate close in front of said cylinder in closed position, said lever being adapted to be depressed for rocking said plate forwardly away from said cylinder to open position.

2. In a device of the character described, the combination with a flat base, a cylinder mounted close above the base parallel thereto, and a rod extending parallel to the base and cylinder beneath the cylinder in the space between the cylinder and base, of a shutter fashioned from a sheet-metal strip looped at a point intermediate of its ends to provide a sleeve receiving said rod therethrough and pivotally mounting the shutter upon said rod, one end portion of the strip curving upwardly and forwardly from said sleeve to provide an arcuate shutter plate rising about said cylinder and the other end portion of said strip extending rearwardly from said sleeve at an acute angle to said plate to provide a lever, and a resilient pad fixed to the base beneath the inner end portion of said lever and having a beveled upper face seating the lever and normally holding said lever to incline upwardly relative to the base and maintain said shutter plate close in front of said cylinder in closed position, said lever being adapted to be depressed for rocking said plate forwardly away from said cylinder to open position.

CHARLES S. BOLOGNINO.
SECONDO M. BOLOGNINO.

REFERENCES CITED

The following references are of record in the file of this patent:

UNITED STATES PATENTS

| Number | Name | Date |
| --- | --- | --- |
| 659,835 | Thomas | Oct. 16, 1900 |
| 1,158,774 | Beard | Nov. 2, 1915 |
| 1,293,392 | Fassa | Feb. 4, 1919 |
| 1,973,192 | Woodbury | Sept. 11, 1934 |
| 2,285,444 | Kloid | June 9, 1942 |
| 2,480,228 | Diamond | Aug. 30, 1949 |

FOREIGN PATENTS

| Number | Country | Date |
| --- | --- | --- |
| 421,934 | Germany | Nov. 30, 1915 |